United States Patent [19]

Dingilian et al.

[11] Patent Number: 5,362,717

[45] Date of Patent: Nov. 8, 1994

[54] N-HALOCHITOSANS, THEIR PREPARATION AND USES

[75] Inventors: Edward O. Dingilian, Newark, Del.; George E. Heinsohn, Elkton, Md.

[73] Assignee: Vanson L. P., Redmond, Wash.

[21] Appl. No.: 21,825

[22] Filed: Feb. 24, 1993

Related U.S. Application Data

[62] Division of Ser. No. 613,602, Nov. 14, 1990, Pat. No. 5,204,452.

[51] Int. Cl.$^5$ .................... A61K 31/73; A61K 31/70; C07H 5/06; C08B 37/08
[52] U.S. Cl. ........................ 514/55; 514/62; 536/20; 536/55.2; 536/122
[58] Field of Search ............ 514/55, 62; 536/20, 536/122, 55.2

[56] References Cited

U.S. PATENT DOCUMENTS 4,931,551 6/1990 Albisetti et al. ................ 536/20

FOREIGN PATENT DOCUMENTS 60-186504 9/1985 Japan .
01011101 1/1989 Japan .

OTHER PUBLICATIONS

Comprehensive Organic Chemistry, Edited by I. O. Sutherland, Pergamon Press, vol. 2, pp. 40–41.
Y. Shigeno et al., "Journal of Applied Polymer Science" vol. 25 731–738 (1980).
T. Uragami et al., "Makromol. Chem., Rapid Commun.", vol. 4 pp. 99(1983).

*Primary Examiner*—John W. Collins
*Assistant Examiner*—Everett White

[57] ABSTRACT

N-Halochitosans which are terpolymers containing 1 to 35% of 2-deoxy-2-acetaminodoglucose monomeric units, 1 to 90% of 2-deoxy-2-haloaminoglucose monomeric units, and 8–98% of 2-deoxy-2-haloaminoglucose monomeric units wherein the halogen is chlorine or bromine and their preparation is disclosed. The preferred preparation is by treatment of an aqueous solution of a chitosan salt with a halogenating agent.

7 Claims, No Drawings

N-HALOCHITOSANS, THEIR PREPARATION AND USES

CROSS-REFERENCE TO RELATED APPLICATION

This application is a divisional of U.S. patent application Ser. No. 07/613,602, filed Nor. 14, 1990, now U.S. Pat. No. 5,204,452.

FIELD OF THE INVENTION

This invention relates to polymeric halo derivatives of chitosan, their preparation by reacting chitosan with a halogenating agent, and their use as flocculating aids. More particularly, the invention relates to terpolymers comprising 1–35%, preferably about 25% of 2-deoxy-2-acetamidoglucose monomeric units, 1–90% of 2-deoxy-2-aminoglucose monomeric units, and 8–98% of 2-deoxy-2-haloaminoglucose monomeric units wherein the halogen is chlorine or bromine. Such compositions are referred to hereinafter as N-halochitosans.

BACKGROUND OF THE INVENTION AND PRIOR ART

Chitin is a polymer of beta-1,4-(2-deoxy-2-acetamidoglucose) which occurs widely in nature and is a principal constituent of the exoskeleton of many arthropods and insects, and of the cell wall of many fungi. It is frequently found in a mixture with proteins and calcium compounds. It consists essentially of a polymer of 2-deoxy-2-acetamidoglucose monomer units that are linked in beta-1,4 fashion though a minor fraction of said units may be hydrolyzed to 2-deoxy-2-aminoglucose units.

The term chitosan is generally applied to copolymers having greater than 65% 2-deoxy-2-aminoglucose monomeric units and the remainder monomeric units being 2-deoxy-2-acetamidoglucose units. Chitosan is derived from chitin by hydrolysis of some 2-deoxy-2-acetamidoglucose units to 2-deoxy-2-aminoglucose units. Due to the presence of free amino groups, chitosan is soluble in aqueous acidic solutions and is present in such media as a polycation with the protonated amino group bearing a positive charge. Polycations are known to aid flocculation.

The reaction of polymeric amines such as chitosan with halogenating agents has been studied only sparsely. Y. Shigeno, K. Kondo, and K. Takemoto [Journal of Applied Polymer Science, Vol. 25, 731–738 (1980)] studied the reaction of chitosan with solutions of iodine in various solvents including water. They found that the only products formed were deeply colored charge transfer complexes that were produced over a period of days at 30° C. No evidence of iodination of the amino group was found.

T. Uragami, F. Yoshida, and M. Sugihara [Makromol. Chem., Rapid Commun., Vol. 4, 99 (1983)] found that chitosan-containing membranes actively transport chloride ions. Chloride ions bear a negative charge and are therefore not capable of acting as halogenating agents by donating positively charged chlorine. As would be anticipated, no N-chlorinated species were observed in this study.

K. Takeda, K. Shimazu, and M. Goto (Japan Kokai Tokkyo Koho JP 01 11,101, 13 Jan. 1989) treated chitosan in solution with chlorine dioxide. The molecular weight of the chitosan polymer was thereby reduced from 360,000 to 60,000, but there was no incorporation of chlorine into the chitosan, and hence no 2-deoxy-2-chloraminoglucose monomeric units in the product.

H. Sano, H. Itoi, and N. Kobiyama (Jpn. Kokai Tokkyo Koho JP 60,186,504, 24 Sep. 1987) reacted an aqueous dispersion of high molecular weight chitosan with chlorine gas at 10°–70° C. The product isolated was chitosan with a reduced molecular weight of 20,000. No incorporation of chlorine into the product was reported.

SUMMARY OF THE INVENTION

We have found that halogen atoms way be attached to the nitrogen atoms of chitosan to form N-halochitosans by treating chitosan or a salt of chitosan with a halogenating agent.

We have further found that the resulting N-halochitosans are more effective than chitosan as flocculation aids.

DETAILED DESCRIPTION OF THE INVENTION

The treatment of chitosan or preferably an aqueous solution of a chitosan salt with an appropriate halogenating agent results in the conversion of some to essentially all of the 2-deoxy-2-aminoglucose monomeric units present in chitosan to 2-mono or 2,2-dihalo aminoglucose monomeric units to yield a novel polymeric composition having superior flocculating properties.

The term halogenating agent is used in the conventional sense of being those agents having halogen bound to a strongly electronegative atom such as oxygen, nitrogen, or another halogen, and capable of donating a positively charged halogen atom. Suitable halogenating agents include sodium hypochlorite, calcium hypochlorite, chlorine, bromine, aqueous chlorine solutions, aqueous bromine solutions, N-chlorosuccinimide, sodium hypobromite, pyridinium bromide perbromide, N-bromosuccinimide, chloramine-T, and the like. Other suitable halogenating agents will be readily apparent to those skilled in the art. Sodium hypochlorite is preferred because of its ready availability and low cost.

While N-halochitosans can be prepared by direct action of the halogenating agent on chitosan, the preferred mode is by action of the halogenating agent on an aqueous solution of a chitosan salt. In this manner, the halogenating agent is not concentrated at the surface of the solid polymer causing non-uniformity between the surface and the interior of the particle. When it is desired to isolate the N-halochitosan, the concentration of chitosan salt may be from about 0.1 to 5.0% preferably from about 0.2–2%. When it is desired to use the N-halochitosan as a flocculating aid, it is preferred to add 1–1000 ppm of the chitosan salt to the material to be flocculated and then adding the halogenating agent so that the N-halochitosan is formed in intimate contact with the flocculate to achieve maximum efficiency.

The formation of N-halochitosans can be conducted at 0° to 80° C., preferably at 15°–30° C. to optimize reaction rate and minimize decomposition of the product.

The halogenating agent can be employed at levels of from about 0 to 3 stoichiometric equivalents of available halogen per equivalent of 2-aminoglucose monomeric units in the chitosan. Depending on the amount of halogenating agent employed, the degree of halogen substitution on the 2-aminoglucose unit will vary from about 0 to 2 halogen atoms per 2-aminoglucose unit. For flocculation applications, a degree of substitution of from about 0.3 to 1.8 is preferred. Depending on the halogenating agent chosen, the reaction is generally complete in 1-60 minutes. When sodium hypochlorite is chosen, the reaction is very rapid and is complete in less than 10 minutes. Less reactive halogenating agents such as N-bromosuccinimide may require 30-60 minutes or even longer depending on temperature. The N-halochitosan may be isolated from the reaction mixture by conventional techniques such as filtration or centrifugation.

Illustrative of the materials to be flocculated by the products of our invention there may be mentioned proteins, algae, carbohydrates, oils (edible and hydrocarbon), metallic oxides, poultry processing waste water and brewery sludge. In some instances, the N-halochitosans are able to produce results equivalent to those achieved with chitosan at a significantly lower rate of application. In other cases, notably oils, the N-halochitosans are able to induce flocculation in systems where chitosan is totally ineffective.

EXAMPLES

Example 1

The chitosan employed in this and subsequent examples was Profloc ® F, obtained from Protan, Inc., Raymond, Wash. It contained 28% 2-deoxy-2-acetamidoglucose and 72% 2-deoxy-2-aminoglucose monomeric units and was used without further purification. To 100 ml of water was added 1.0 g of chitosan and 1.0 g of glacial acetic acid to make a solution of chitosan acetate. To 22.6 ml of this solution at 20C. was added 6.26 g of commercial 5% sodium hypochlorite. This corresponds to a ratio of two available chlorine atoms per equivalent of amino groups in the polymer. The mixture was stirred for 3 minutes and the N-chlorochitosan isolated by filtration. Iodimetric titration with sodium thiosulfate revealed that the degree of substitution was 1.53.

Example 2

This example illustrates the preparation of N-chlorochitosan from chitosan and chloramine-T and the enhanced performance of N-chlorochitosan over chitosan in flocculating an aqueous dispersion of peanut oil.

A dispersion of peanut oil in water was prepared by mixing 4.0 g of peanut oil with 800 ml water for 5 minutes in a laboratory blender at 12,000 RPM. The dispersion was white and opaque and did not separate into distinct layers after standing undisturbed for 1 hour. The absorbance of this dispersion measured in a 1.0 cm cell at a wavelength of 660 nm was 1.610 when examined 0.5 hr after preparation.

To 100 ml of freshly prepared peanut oil dispersion was added a solution of chitosan containing 1.0 mg/ml chitosan and 1.0 mg per ml acetic acid in the amounts described in Table 1 which follows. In those cases where chloramine-T was employed, it was then added as a solution containing 5.7 $\mu$mole/ml in the amounts described in Table 1. The mixture was then allowed to stand undisturbed for 15 minutes and a sample withdrawn from the middle of the mixture for measurement of light absorbance as described above. Results are summarized in the following table:

TABLE 1

| Run No. | ml chitosan Solution | ml chloramine-T Solution | Absorbance |
|---|---|---|---|
| 1 | 15 | 0 | 1.496 |
| 2 | 14 | 14 | 0.212 |
| 3 | 12 | 12 | 0.164 |
| 4 | 10 | 0 | 1.444 |
| 5 | 10 | 6.5 | 0.186 |
| 6 | 10 | 13.0 | 0.023 |

In the cases where chloroamine-T was employed, separation of layers began within 2-3 minutes. After 15 minutes, white semi-solid had separated to the top and clear, colorless liquid to the bottom as evidenced by the low light absorbance. When chloramine-T was not employed, the entire mixture remained uniform and opaque.

Example 3

This example illustrates the preparation of N-chlorochitosan from chitosan and N-chlorosuccinimide. Separate solutions were prepared by dissolving 1.0 g chitosan (4.03 m mole $NH_2$) in ml of 1% acetic acid solution and by dissolving 0.76 (5.7 m mole) of N-chlorosuccinimide in 76 ml of water. These clear solutions were mixed together and stirred at 22° C. After 3-4 minutes a cloudy appearance developed and after 30 minutes the entire mixture was semi-solid. After 80 minutes, the gel was broken up mechanically, allowing a liquid phase to separate and the gel collected by filtration and washed with three 100 ml portions of water. Analyses by iodometric titration revealed that the gel contained 3.21 m mole chloramine, equivalent to conversion of 80% of the 2-aminoglucose units to 2-chloroaminoglucose units.

Example 4

This example illustrates the preparation of N-bromochitosan from chitosan and an aqueous solution of bromine.

A solution containing 0.223 m mole/ml of bromine was prepared by dissolving about 4 g of bromine in 100 ml of 0.1N NaOH. A second solution was prepared by dissolving 1.0 g of chitosan in 100 ml of 1% acetic acid solution. To 45.8 ml of the chitosan-containing solution (1.85 m mole $NH_2$) was added 16.56 ml of the bromine solution and the mixture stirred for 45 minutes at 22° C. The solid was separated by filtration and washed with water. Iodometric titration of the solid revealed the presence of 0.56 m mole of bromamine, equivalent to conversion of 30% of the 2-aminoglucose monomeric units to 2-bromoaminoglucose.

Example 5

This example illustrates the enhanced performance of N-chlorochitosan over chitosan in flocculating a dispersion of crude oil. The oil dispersion was prepared by mixing 4.0 g of crude oil with 800 ml of water in a laboratory blender at 12,000 RPM for 5 minutes. It was black in color and completely opaque so that the absorbance of light of 660 nm wavelength was infinite when measured in a 1 cm cell. The dispersion was stable and did not separate into distinct layers even after standing undisturbed for 4 hours. To 100 ml of this dispersion was added a solution containing 1.0 mg/ml chitosan and 1.0 mg/ml acetic acid in the amounts indicated in Table 2. After mixing, a solution containing 4.3 $\mu$ mole/ml sodium hypochlorite was added in the amounts indicated in Table 2 and the solution allowed to stand undisturbed for 15 minutes. In the cases where chitosan alone was employed, there was no visible change. In the cases where N-chlorochitosan was generated in situ from chitosan and sodium hypochlorite, separation of phases began within minutes. Black, oily semi-solid rose to the top leaving clear, colorless liquid below. After 15 minutes, samples were withdrawn from the middle of the mixture and the absorbance of light of 660 nm wavelength measured in a 1 cm cell. The results are summarized in Table 2, illustrating the enhanced flocculation of crude oil with N-chlorochitosan.

TABLE 2

| Run No. | ml chitosan Solution | ml sodium hypochlorite Solution | Absorbance 660 nm |
| --- | --- | --- | --- |
| 1 | 15 | 0 | |
| 2 | 10 | 0 | |
| 3 | 5 | 0 | |
| 4 | 10 | 10 | .027 |
| 5 | 7 | 7 | .042 |

When higher proportions of chitosan and sodium hypochlorite to crude oil were employed, the sedimented layer became more rigid. At a ratio of 20 mg chitosan to 86 μ mole NaOCl to 100 ml of oil dispersion, the oil separated as spheres of 2 mm diameter that were solidified and could be separated from the liquid by conventional liquid-solid separation techniques such as filtration.

Example 6

This example illustrates the enhanced performance of N-chlorochitosan over chitosan in the flocculation of algae. A sample of pond water containing several species of algae was collected at Moores Lake, Dover, Del. The turbidity as measured by standard nephelometric techniques was 9.2 NTU. To 50 ml of this water was added a solution containing 0.5 mg/ml chitosan and 0.5 mg/ml acetic acid in the amounts indicated in Table 3. After mixing for 1 minute, a solution containing 2.15 μ mole/ml sodium hypochlorite was added in the amounts indicated in Table 3. The mixture was allowed to stand undisturbed for 15 minutes and samples withdrawn from the middle of the mixture for measurement of turbidity.

When chitosan alone was employed, some of the algae flocculated and settled to the bottom, but much remained suspended giving the water a distinct green color. When N-chlorochitosan was generated in situ from chitosan and sodium hypochlorite, essentially all of the algae was sedimented leaving colorless water above the sediment.

TABLE 3

| Run No. | ml chitosan Solution | ml NaOCl Solution | Turbidity, NTU |
| --- | --- | --- | --- |
| 1 | 2 | 0 | 6.0 |
| 2 | 3 | 0 | 6.0 |
| 3 | 2 | 2 | 1.0 |
| 4 | 2 | 3 | 1.8 |

What is claimed is:

1. A polymeric composition consisting essentially of 1–35% of 2-deoxy-2-acetamidoglucose monomeric units, 1–90% of 2-deoxy-2-aminoglucose monomeric units and 8–98% of 2-deoxy-2-haloaminoglucose monomeric units, wherein the haloamino grouping is chloroamino or bromoamino.

2. The polymeric composition of claim 1 wherein the haloamino grouping is chloroamino.

3. The composition of claim 1 in which the degree of halogen substitution is from 0.3 to 1.8 halogen atoms per 2-aminoglucose unit.

4. The composition of claim 2 in which the degree of halogen substitution is from 0.3 to 1.8 halogen atoms per 2-aminoglucose unit.

5. The composition of claim 4 in which the degree of halogen substitution is about 1.53 halogen atoms per 2-aminoglucose unit.

6. A N-halochitosan consisting of about 25% 2-deoxy-2-acetamidoglucose monomeric units, and the balance 1–90% 2-deoxy-2-aminoglucose monomeric units and 8–98% 2-chloro-2-aminoglucose monomeric units.

7. The N-halochitosan of claim 6 in which the degree of halogen substitution is from 0.3 to 1.8 halogen atoms per 2-aminoglucose unit.

* * * * *